US012668203B2

(12) United States Patent
Franco et al.

(10) Patent No.: US 12,668,203 B2
(45) Date of Patent: Jun. 30, 2026

(54) MULTI-CHAMBER AIRBAG

(71) Applicants:DALPHI METAL ESPANA SLU, Vigo (ES); SAFELIFE INDUSTRIA DE COMPONENTES DE SEGURANCA AUTOMOVEL LDA, Gemieira (PT); ZF AUTOMOTIVE SAFETY GERMANY GMBH, Aschaffenburg (DE)

(72) Inventors: Bartolomeu Franco, Viana do Castelo (PT); Alexandra Balbás Calvo, Vigo (ES)

(73) Assignees: ZF AUTOMOTIVE SAFETY GERMANY GMBH, Aschaffenburg (DE); DALPHI METAL ESPANA, SLU, Vigo (ES); SAFELIFE INDUSTRIA DE COMPONENTES DE SEGURANCA AUTOMOVEL LDA, Gemieira (PT)

( * ) Notice: Subject to any disclaimer, the term of this patent is extended or adjusted under 35 U.S.C. 154(b) by 0 days.

(21) Appl. No.: 19/116,493

(22) PCT Filed: Sep. 28, 2023

(86) PCT No.: PCT/EP2023/076878
§ 371 (c)(1),
(2) Date: Mar. 28, 2025

(87) PCT Pub. No.: WO2024/068834
PCT Pub. Date: Apr. 4, 2024

(65) Prior Publication Data
US 2026/0103162 A1 Apr. 16, 2026

(30) Foreign Application Priority Data

Sep. 30, 2022 (DE) ..................... 10 2022 125 269.8

(51) Int. Cl.
*B60R 21/233* (2006.01)
*B60R 21/239* (2006.01)

(52) U.S. Cl.
CPC .......... *B60R 21/233* (2013.01); *B60R 21/239* (2013.01); *B60R 2021/23324* (2013.01)

(58) Field of Classification Search
CPC ........................... B60R 21/239; B60R 21/233
See application file for complete search history.

(56) References Cited

U.S. PATENT DOCUMENTS

| | | | | |
|---|---|---|---|---|
| 8,215,665 B2 * | 7/2012 | Ohara | ................. | B60R 21/2346 280/740 |
| 2006/0186655 A1 * | 8/2006 | Ehrke | ................. | B60R 21/2346 280/743.1 |

(Continued)

FOREIGN PATENT DOCUMENTS

| | | | | |
|---|---|---|---|---|
| BE | 794296 A | * | 7/1973 | ........... B60R 21/231 |
| DE | 102009036333 A1 | | 2/2011 | |

(Continued)

OTHER PUBLICATIONS

International Search report for corresponding PCT/EP2023/076878 application, date of mailing Dec. 21, 2023, 4 pages.

*Primary Examiner* — Nicole T Verley
(74) *Attorney, Agent, or Firm* — Tarolli, Sundheim, Covell & Tummino LLP

(57) ABSTRACT

A multi-chamber airbag (10) includes an airbag wall (16) comprising a primary outlet (51) and at least one secondary outlet (52) which encloses an inflatable primary chamber (14), and a gas distribution mechanism (58) comprising a primary closure element (61) and at least one secondary closure element (62). Further, the gas distribution mechanism (58) is adjustable between a first position and a second position. The multi-chamber airbag (10) is configured so that, in the first position, the primary outlet (51) is closed by (Continued)

the primary closure element (61) and the at least one secondary outlet (52) is released so that gas can flow out of the primary chamber (14) via the at least one secondary outlet (52), and, in the second position, the primary outlet (51) is released so that gas can flow out of the primary chamber (14) via the primary outlet (51), and the at least one secondary outlet (52) is closed by the at least one secondary closure element (62).

18 Claims, 4 Drawing Sheets

(56)                    References Cited

U.S. PATENT DOCUMENTS

| | | | |
|---|---|---|---|
| 2006/0192367 A1 | 8/2006 | Zumpano | |
| 2008/0007038 A1 * | 1/2008 | Fischer | B60R 21/2338 |
| | | | 280/743.2 |
| 2013/0313809 A1 * | 11/2013 | Yamaji | B60R 21/233 |
| | | | 280/729 |
| 2017/0282827 A1 | 10/2017 | Choi | |

FOREIGN PATENT DOCUMENTS

| | | | | |
|---|---|---|---|---|
| DE | 102022122698 A1 * | 3/2024 | | B60R 21/239 |
| EP | 2666678 A1 | 11/2013 | | |
| FR | 2168669 A5 * | 8/1973 | | |
| IE | 37019 L * | 7/1973 | | B60R 21/23 |
| JP | 2013086707 A * | 5/2013 | | B60R 21/233 |
| WO | WO-2012099156 A1 * | 7/2012 | | B60R 21/2346 |
| WO | WO-2013058329 A1 * | 4/2013 | | B60R 21/239 |
| WO | 2019170708 A1 | 9/2019 | | |

* cited by examiner

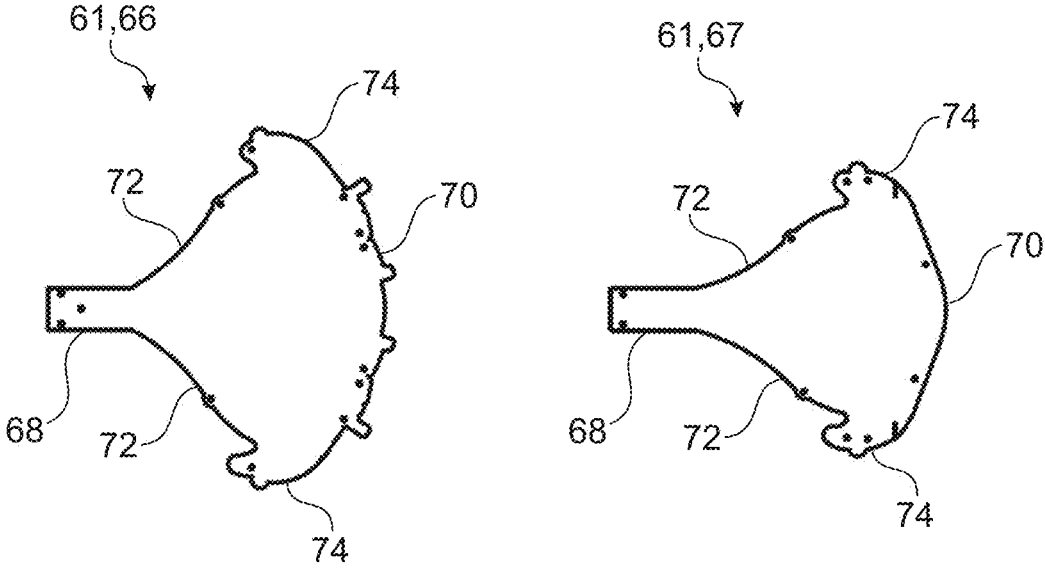
Fig. 11          Fig. 12
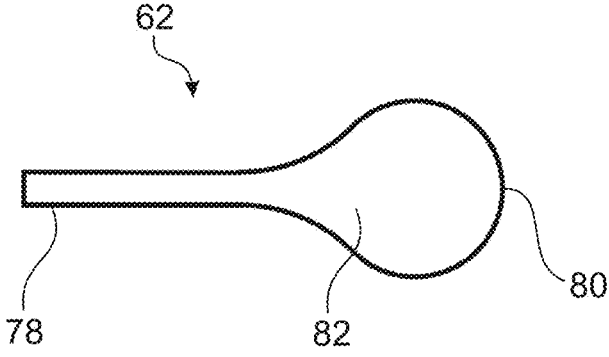
Fig. 13

MULTI-CHAMBER AIRBAG

RELATED APPLICATIONS

This application is a U.S. National Stage Application filed under 35 USC 371, claiming priority to Serial No. PCT/EP2023/076878, filed on 28 Sep. 2023; which claims priority from DE Patent Application 10 2022 125 269.8, filed 30 Sep. 2022, the entireties of which are hereby incorporated herein by reference.

TECHNICAL FIELD

The invention relates to a multi-chamber airbag.

BACKGROUND

Multi-chamber airbags are well-known and are employed in occupant protection systems for automotive vehicles to protect vehicle occupants in a case of restraint such as a crash. Unlike simple airbags, multi-chamber airbags have plural chambers which fill with gas when the multi-chamber airbag is inflated in the case of restraint.

Future vehicles, specifically those including an automated driving mode, offer the comfort of vehicle occupants being allowed to adopt a plurality of different positions during traveling. As a result, the requirements to the occupant protection systems will increase accordingly to protect the vehicle occupants preferably optimally in all positions.

SUMMARY

It is the object of the invention to provide a multi-chamber airbag which can be used in a flexible manner to better protect vehicle occupants in different positions.

The object is achieved by a multi-chamber airbag comprising an airbag wall that encloses an inflatable primary chamber, and comprising a gas distribution mechanism. The airbag wall has a primary outlet and at least one secondary outlet. Further, the gas distribution mechanism has a primary closure element and at least one secondary closure element. The gas distribution mechanism is adjustable between a first position in which the multi-chamber airbag is inflated to a first state and a second position in which the multi-chamber airbag is inflated to a second state. Moreover, the multi-chamber airbag is configured so that, in the first position, the primary outlet is closed by the primary closure element so that no gas can flow out of the primary chamber via the primary outlet, and the at least one secondary outlet is released so that gas can flow out of the primary chamber via the at least one secondary outlet, and, in the second position, the primary outlet is released so that gas can flow out of the primary chamber via the primary outlet, and the at least one secondary outlet is closed by the at least one secondary closure element so that no gas can flow out of the primary chamber via the at least one secondary outlet.

The gas distribution mechanism thus constitutes a kind of directional valve or guide by means of which gas can flow out of the primary chamber either via the primary outlet or via the secondary outlet, when, in the case of restraint, gas flows into the primary chamber to inflate the multi-chamber airbag. In this way, the multi-chamber airbag can be inflated selectively to either of the two states each of which is adjusted to specific conditions. That is, the multi-chamber airbag may have two different geometries in the inflated state, in particular with different volumes and/or different shape, to provide protection adjusted to the seating position of the vehicle occupant with which the multi-chamber airbag is associated. The position of the vehicle occupant can be detected directly, such as via sensors or cameras, or indirectly via the position of the vehicle seat.

In one embodiment, the multi-chamber airbag includes a secondary chamber and a tertiary chamber. The primary chamber is fluid-connected, in the first position of the gas distribution mechanism, via the secondary outlet to the tertiary chamber, while the primary chamber is fluid-connected, in the second position of the gas distribution mechanism, via the primary outlet to the secondary chamber. Specifically, the tertiary chamber has at least one portion which annularly encloses the secondary chamber. By means of the secondary chamber and the tertiary chamber, the multi-chamber airbag can be adjusted reliably into the two states each having its own geometry.

Accordingly, the multi-chamber airbag may have a baffle which in the installed and deployed state of the multi-chamber airbag faces an associated vehicle occupant, as well as a circumferential wall which is connected to the baffle and in the installed and deployed state of the multi-chamber airbag extends between the baffle and a vehicle component to which the multi-chamber airbag is attached. The circumferential wall is designed to be at least partially multi-layered and, in the first state, forms at least one annular tube defining the tertiary chamber. A radially inner layer of the circumferential wall delimits, together with the baffle, the secondary chamber. In this way, in the first state the secondary chamber is stabilized by the at least one annular tube which encloses the secondary chamber at least partially in ring shape.

Further, the at least one annular tube may be provided to have, in the first state, a circular tube cross-section and, in the second state, to be under axial tensile stress so that the radially inner layer and a radially outer layer of the circumferential wall are mutually abutting and extend in the axial direction. This configuration offers the advantage that the multi-chamber airbag has a particularly compact design.

In addition, or alternatively, an axial space between the baffle and the vehicle component can be larger in the second state than in the first state, which results in the multi-chamber airbag providing different protective effects in the inflated states. In particular, the protective effect can be adjusted to different spaces of the vehicle occupant from the multi-chamber airbag.

It can moreover be provided that the primary chamber includes a gas source-side inlet opening and in the main deployment direction abuts on the secondary chamber and is circumferentially delimited by the tertiary chamber. In this way, the paths via which gas flows into the secondary chamber or the tertiary chamber in a case of restraint are particularly short, which reduces the deployment time of the multi-chamber airbag.

According to one embodiment, the airbag wall has a one-piece airbag portion in which the primary outlet and the at least one secondary outlet are disposed. As a result, the multi-chamber airbag has a specifically compact and material-efficient design.

In accordance with another embodiment, the multi-chamber airbag includes plural secondary outlets and a corresponding number of secondary closure elements each of which is associated with one of the secondary outlets, specifically with at least two, at least three or at least four secondary outlets. This configuration offers the advantage that in the first position gas can flow out of the primary chamber simultaneously at different positions via the plural secondary outlets, thus promoting the way in which the multi-chamber airbag deploys in the case of restraint.

The secondary outlets can be disposed in ring shape around the preferably centered primary outlet so that, in the case of restraint, the multi-chamber airbag deploys particularly evenly in the circumferential direction, specifically when the tertiary chamber has an annular portion.

It may further be provided that the at least one secondary closure element is secured to the primary closure element. In this way, all secondary closure elements are connected to the primary closure element and, thus, can be jointly adjusted specifically using one single retaining device.

Accordingly, the at least one secondary closure element can have an elongate retaining end at which the at least one secondary closure element is secured to the primary closure element, an oppositely disposed securing end at which the at least one secondary closure element is secured to the airbag wall, and a closure portion for closing the associated secondary outlet. The multi-chamber airbag is configured so that, in the first position, the closure portion is disposed spaced apart from the associated secondary outlet, and that the closure portion overlaps and, thus, closes the associated secondary outlet, when the multi-chamber airbag is inflated to the second state. As a result, it can be ensured by simple means that the secondary outlet or outlets is/are efficiently closed by the secondary closure element or elements.

In one embodiment, the primary closure element is formed of two superimposed cut portions each having a fan-shaped or bell-shaped design as well as an elongate end and an oppositely disposed circumferential edge to which the cut portion is secured on the airbag wall. The cut portions are sewn up with each other at the elongate end and at a respective edge section in the area of the circumferential edge. Further, the cut portions are not connected over a major part of the side edges interposed between the elongate end and the circumferential edge so that two lateral outflow openings are formed in the primary closure element. This design ensures the primary closure element to efficiently close the primary outlet in the first position and to adjust or deploy in the second position by the pressure of the gas flowing into the primary chamber so that the primary outlet is reliably released.

The primary closure element may be provided to be completely disposed in the secondary chamber in the second position, specifically wherein the primary closure element in the first position extends out of the secondary chamber through the primary outlet into the primary chamber. As a result, the gas distribution mechanism can have a specifically compact and effective design.

In addition, or alternatively, the at least one secondary closure element may be provided to be completely disposed in the primary chamber in the first position, specifically wherein the at least one secondary closure element in the second position extends out of the primary chamber through the primary outlet into the secondary chamber. In this way, the gas distribution mechanism can have a specifically compact and effective design.

In another embodiment, the gas distribution mechanism has a retaining device adjustable between a retaining position and released position. The multi-chamber airbag is configured so that, in the released position, the primary closure element and the at least one secondary closure element are disconnected from the retaining device and, in the retaining position, the primary closure element and the at least one secondary closure element are secured to the retaining device. Thus, the multi-chamber airbag can be reliably inflated in the case of restraint selectively to the first or the second state.

Moreover, the primary closure element and/or the at least one secondary closure element can be formed of an airbag fabric, which results in a specifically efficient and low-cost design thereof.

BRIEF DESCRIPTION OF THE DRAWINGS

Further advantages and features will be evident from the following description and from the attached drawings, wherein:

FIG. 13 shows a schematic representation of a cut of a secondary closure element of the multi-chamber airbag of FIG. 1.

DESCRIPTION

Figures 1, 2:
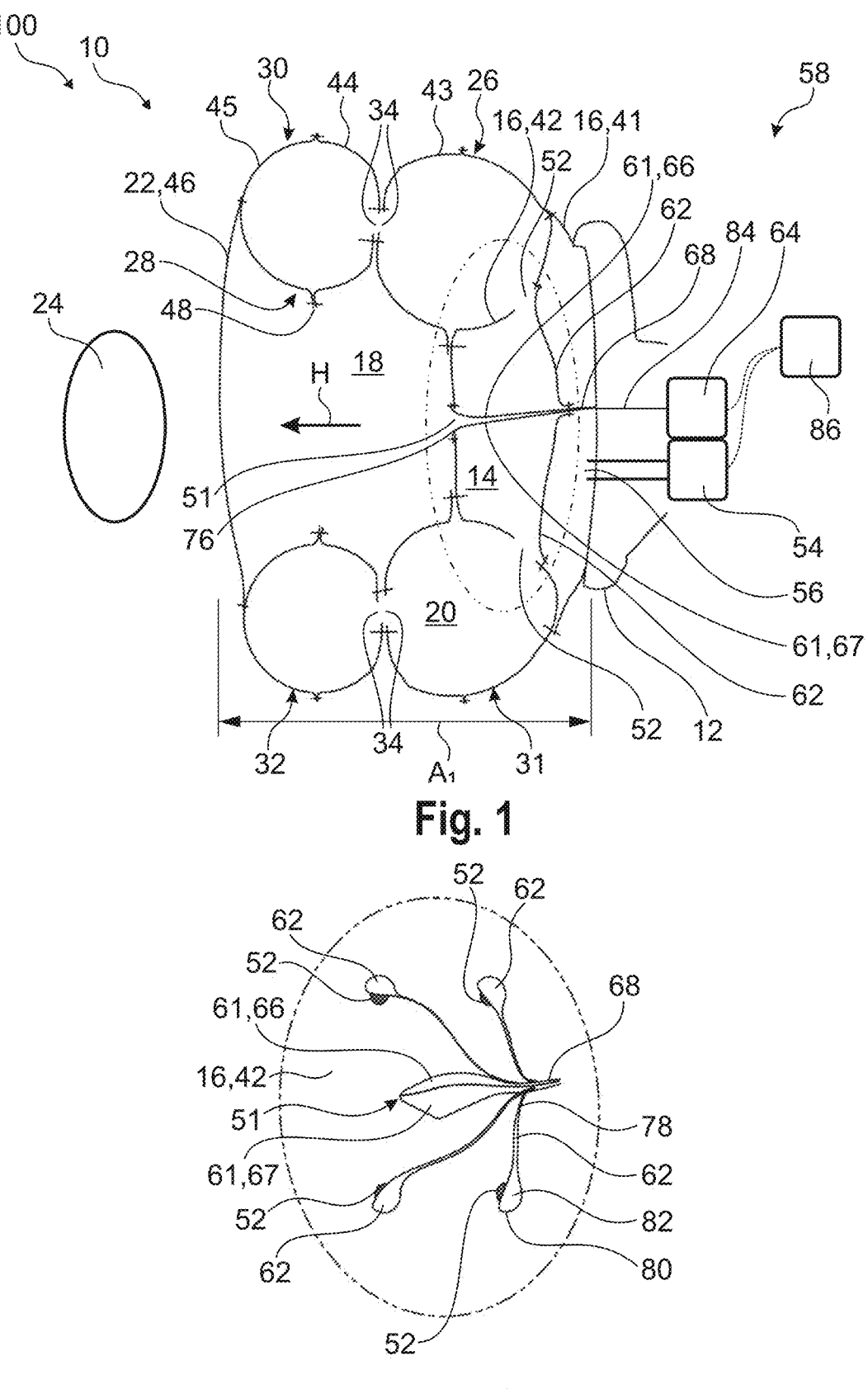
FIG. 1 shows a schematic representation of a multi-chamber airbag according to the invention comprising a gas distribution mechanism in a first position.
FIG. 2 shows a detail view of a part of the gas distribution mechanism of FIG. 1.

FIG. 1 illustrates a multi-chamber airbag 10 for an occupant protection system of an automotive vehicle.

The multi-chamber airbag 10 in this case is a driver multi-chamber airbag, i.e., it is provided for the driver side of the automotive vehicle.

In the present embodiment, the multi-chamber airbag 10 is a front airbag disposed on a vehicle component 12 of the automotive vehicle.

The vehicle component 12 is a steering wheel of the automotive vehicle.

Basically, the multi-chamber airbag 10 may be any multi-chamber airbag and/or may be secured to any element of the vehicle; specifically, it is a front airbag which protects in the case of a frontal crash.

The multi-chamber airbag 10 has a primary chamber 14 that is delimited by an airbag wall 16, as well as a secondary chamber 18 and a tertiary chamber 20.

The secondary chamber 18 is delimited at the end face by the airbag wall 16 and a baffle 22 of the multi-chamber airbag 10 that is disposed in a main deployment direction H of the multi-chamber airbag 10 opposite to the airbag wall 16.

The baffle 22 in the inflated state of the multi-chamber airbag 10 faces a vehicle occupant 24 for which the multi-chamber airbag 10 provides a protective effect in the case of restraint.

In this context, the multi-chamber airbag 10 is configured to be inflated to a first state (see FIG. 1) or a second state (see FIG. 3) so as to provide, in the case of restraint, a protective effect which is adapted specifically to the position of the vehicle occupant 24 inside the vehicle.

Further, the secondary chamber 18 is delimited on its circumferential side with respect to the main deployment direction H by a multi-layer circumferential wall 26 of the multi-chamber airbag 10 which extends, in both inflated states of the multi-chamber airbag 10, in the main deployment direction H from the vehicle component 12 to the baffle 22.

The multi-layer circumferential wall 26 has a radially inner layer 28 delimiting the secondary chamber 18 and a radially outer layer 30 forming an outer wall of the multi-chamber airbag 10.

The tertiary chamber 20 is delimited by the radially inner layer 28 and the radially outer layer 30.

Thus, the primary chamber 14 is disposed in the main deployment direction H adjacent to the secondary chamber 18, and the tertiary chamber 20 at least partially delimits the primary chamber 14 and the secondary chamber 18 circumferentially.

In the present embodiment, the circumferential wall 26 defines two annular tubes 31, 32 which are fluid-connected to each other via communication ports 34 and each of which has, in the first state, a substantially circular tube cross-section.

In the second state, the tertiary chamber 20 is not inflated and in the main deployment direction H is tensile-loaded by the inflated secondary chamber 18, thus causing the radially inner layer 28 to abut on the radially outer layer 30 and, resp., these layers to be arranged adjacent to each other and to extend in the main deployment direction H.

The axial distance A1 (see FIG. 1) in the main deployment direction H between the vehicle component 12 and the baffle 22 in the first state is smaller than the axial distance A2 (see FIG. 3) in the second state.

As a matter of course, in an alternative embodiment, the circumferential wall 26 may have any number of annular tubes 31, 32 which delimit the tertiary chamber 20, specifically only one single annular tube 31, 32.

Figures 5, 6, 7, 8, 9, 10:
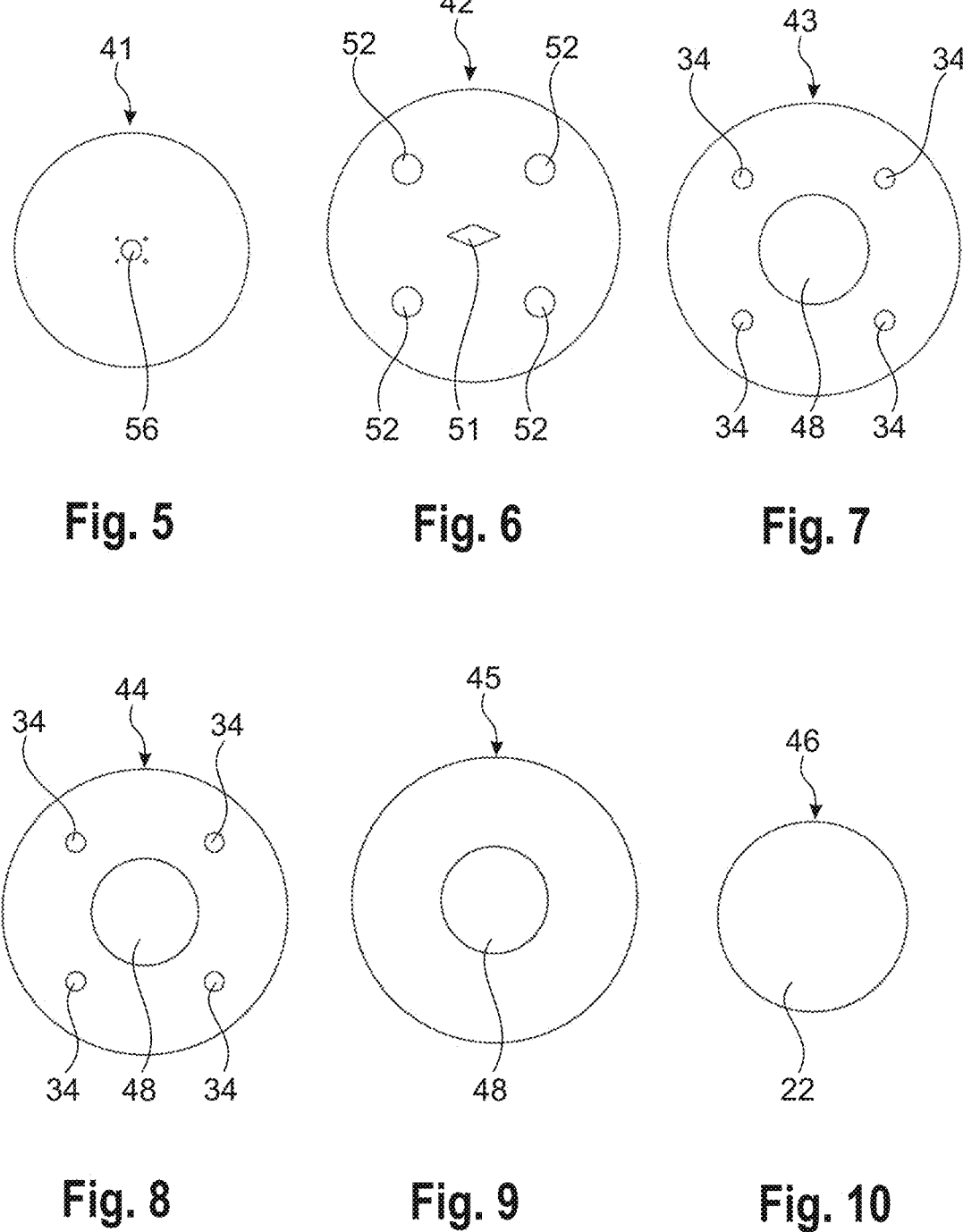

In this context, the multi-chamber airbag 10 has a first cut 41 (see FIG. 5), a second cut 42 (see FIG. 6), a third cut 43 (see FIG. 7), a fourth cut 44 (see FIG. 8), a fifth cut 45 (see FIG. 9) and a sixth cut 46 (see FIG. 10).

Each of the cuts 41-46 is formed of a one-piece airbag fabric and is designed to be specifically circular or annular.

The first cut 41 is disposed on the vehicle component 12 and together with the second cut 42 forms the airbag wall 16.

The second cut 42 forms a partition between the primary chamber 14 and the secondary chamber 18 as well as a partition between the primary chamber 14 and the tertiary chamber 20.

The second, third, fourth and fifth cuts 42, 43, 44, 45 form the circumferential wall 26, the radially inner layer 28 being formed by the third, fourth and fifth cuts 43, 44, 45.

Each of the third, fourth and fifth cuts 43, 44, 45 has a central opening 48 through which the secondary chamber 18 extends.

In the third and fourth cuts 43, 44 the communication ports 34 are provided which in this case are disposed concentrically to the central opening 48 as well as at regular intervals in the circumferential direction.

The third and fourth cuts 43, 44 are designed identically, which may also be different, however.

The sixth cut 46 forms the baffle 22.

Basically, the cuts 41-46 can have any design.

Further, in an alternative embodiment, the secondary chamber 18 and the tertiary chamber 20 may be disposed and designed at will. Specifically, each of the secondary chamber 18 and the tertiary chamber 20 can be delimited by any airbag wall and/or may not abut on each other or have no common partition.

The airbag wall 16 has a primary outlet 51 which fluid-connects the primary chamber 14 to the secondary chamber 18 as well as four secondary outlets 52 which fluid-connect the primary chamber 14 to the tertiary chamber 20.

The primary outlet 51 and the secondary outlets 52 are provided in the second cut 42.

Furthermore, the primary outlet 51 is arranged centrally and is diamond-shaped (see FIG. 6).

The secondary outlets 52 in the present embodiment have a circular design and are arranged concentrically to the primary outlet 51 and at regular intervals in the circumferential direction.

In an alternative embodiment, the airbag wall 16 may have any number of secondary outlets 52, specifically at least two, at least three or at least four secondary outlets 52. In all embodiments, the airbag wall 16 includes at least one secondary outlet 52, however.

Moreover, an inflator 54 is provided by means of which the multi-chamber airbag 10 can be inflated in a case of restraint to provide a protective effect for the vehicle occupant 24.

The inflator 54 is part of the multi-chamber airbag 10 and is connected, via the inlet opening 56, to the primary chamber 14 so that the gas generated by the inflator 54 in the case of restraint flows into the primary chamber 14 via the inlet opening 56.

In an alternative embodiment, the inflator 54 can be provided separately from the multi-chamber airbag 10 and 7 or may be disposed at any position in the vehicle or in the multi-chamber airbag 10, such as in the primary chamber 14.

In all cases, however, the inflator 54 is connected to the primary chamber 14 such that the gas generated by the inflator 54 in the case of restraint flows into the primary chamber 14 to inflate the multi-chamber airbag 10.

In order to adjust the multi-chamber airbag 10 selectively to the first state (see FIG. 1) or to the second state (see FIG. 3), the multi-chamber airbag 10 includes a gas distribution mechanism 58 comprising a primary closure element 61 and four secondary closure elements 62 as well as a retaining device 64 that is adjustable between a released position and a retaining position.

The gas distribution mechanism 58 has a first position (see FIGS. 1 and 2) by means of which the multi-chamber airbag 10 can be inflated to the first state, and a second position (see FIGS. 3 and 4) by means of which the multi-chamber airbag 10 can be inflated to the second state.

The first position in this case constitutes an initial position of the multi-chamber airbag 10.

The primary closure element 61 is formed of a first cut portion 66 (see FIG. 11) and a second cut portion 67 (see FIG. 12) each being fan-shaped and each having an elongate end 68, an oppositely arranged circumferential edge 70 and two lateral edges 72 which extend between the elongate end 68 and the circumferential edge 70.

In the present embodiment, the first cut portion 66 and the second cut portion 67 are formed by separate cuts.

In an alternative embodiment, the first cut portion 66 and the second cut portion 67 can be connected integrally to each other, specifically at the elongate end 68, and, thus, can be formed by one single cut.

In order to form the primary closure element 61, the cut portions 66, 67 are arranged opposing each other and are connected, specifically sewn up, to each other at their elongate ends 68 and at boundary areas 74 in the area of the circumferential edges 70.

Figures 3, 4:
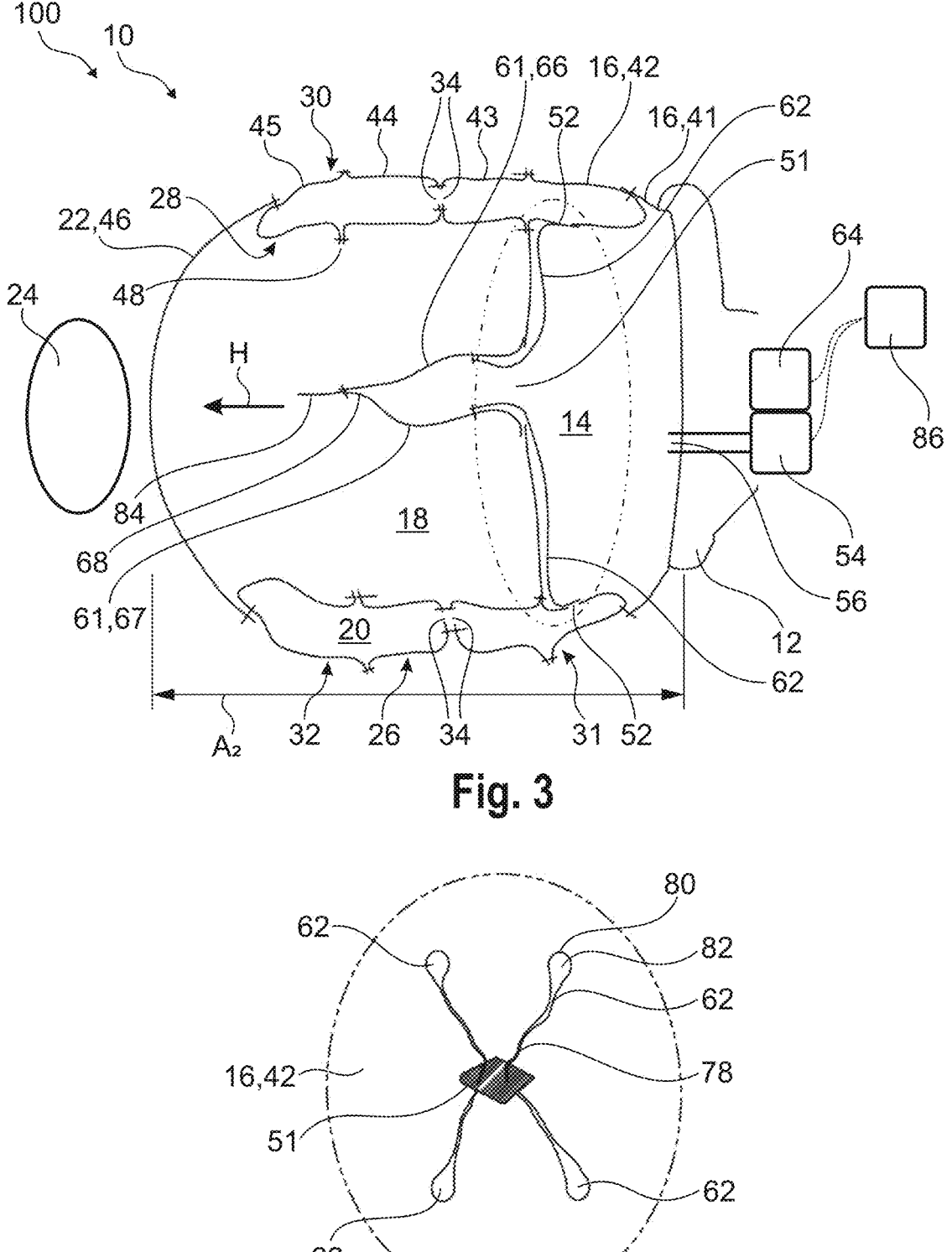
FIG. 3 shows a schematic representation of the multi-chamber airbag of FIG. 1 comprising the gas distribution mechanism in a second position.
FIG. 4 shows a detail view of a part of the gas distribution mechanism of FIG. 3, FIGS. 5 to 10 show a schematic representation of cuts of the multi-chamber airbag of FIG. 1, FIGS. 11 and 12 show a schematic representation of cuts of a primary closure element of the multi-chamber airbag of FIG. 1.

Accordingly, the lateral edges 72 or at least a major part of the lateral edges 72 are not interconnected so that two lateral discharge openings are formed in the primary closure element 61 which are disposed, in FIGS. 1 and 3, outside the image plane and thus are not illustrated.

In this way, the primary closure element 61 is funnel-shaped having two opposite open sides.

The primary closure element 61 is secured, specifically by means of a seam, via the circumferential edges 70 to the airbag wall 16 adjacent to the primary outlet 51.

In the illustrated embodiment, the primary closure element 61 is secured to a side of the airbag wall 16 facing the secondary chamber 18 and in the first position extends out of the secondary chamber 18 through the primary outlet 51 into the primary chamber 14. In the second position, the primary closure element 61 is disposed completely in the secondary chamber 18. This design offers the advantage that the primary closure element 61 in the first position has a collar 76 in the area of the primary outlet 51 which collar 76 promotes inversion of the primary closure element 61 out of the primary chamber 14 into the secondary chamber 18, when the multi-chamber airbag 10 is adjusted to the second state, which will be explained below.

In an alternative embodiment, the primary closure element 61 can be secured to the side of the airbag wall 16 facing the primary chamber 14 and, in the first position, can be disposed completely in the primary chamber 14. In this case, the primary closure element 61 extends, in the second position, out of the primary chamber 14 through the primary outlet 51 into the secondary chamber 18.

As illustrated in FIG. 13, each of the secondary closure elements 62 includes an elongate retaining end 78, an oppositely disposed securing end 80 and a closure portion 82.

In the shown embodiment, the secondary closure elements 62 are spoon-shaped as well as identically designed.

As a matter of course, the secondary closure elements 62 may have any design in an alternative embodiment.

Each of the secondary closure elements 62 is secured, with the securing end 80 adjacent to a secondary outlet 52, to the airbag wall 16 on the side facing the primary chamber 14.

Furthermore, each of the secondary closure elements 62 is secured, via the elongate retaining end 78, to the primary closure element 61, specifically to the elongate ends 68.

In the first position, the secondary closure elements 62 are completely disposed inside the primary chamber 14, while the secondary closure elements 62 in the second position extend out of the primary chamber 14 through the primary outlet 51 into the secondary chamber 18.

Each of the secondary closure elements 62 is associated to a secondary outlet 52 and is designed so that the closure portion 82 reliably covers and thus closes the associated secondary outlet 52 in the second position.

The number of the secondary closure elements 62 therefore corresponds to the number of the secondary outlets 52. That is to say that, in an alternative embodiment in which the airbag wall 16 includes fewer or more secondary outlets 52 than in the illustrated embodiment, the gas distribution mechanism 58 includes correspondingly fewer or more secondary closure elements 62.

At the primary closure element 61, specifically at the elongate ends 68, a tether 84 of the gas distribution mechanism 58 is secured via which the primary closure element 61 and the secondary closure elements 62 in the first position are coupled to the retaining device 64.

For securing the tether 84, a loop may be provided on or may be formed by the primary closure element 61, with the tether 84 acting upon said loop. For example, the loop may be formed by the interconnected elongate ends 68.

The tether 84 extends through the inlet opening 56 to the retaining device 64 which, in the present embodiment, is disposed outside the primary chamber 14.

In an alternative embodiment, the tether 84 extends through an opening in the airbag wall 16 which is provided separately from the inlet opening 56.

In another alternative embodiment, the retaining device 64 is disposed inside the primary chamber 14.

Further, the retaining device 64 is secured to the vehicle component 12.

In particular, the retaining device 64 is the only retaining device of the gas distribution mechanism 58.

In the initial position, the primary closure element 61 and the secondary closure elements 62 are secured, via the tether 84, to the retaining device 64 which to this end is in the retaining position.

In order to ensure reliable coupling to the retaining device 64 in the retaining position, the tether 84 may include an eyelet through which a retaining element such as a retaining bolt of the retaining device 64 extends.

In the released position, the retaining element does not extend through the eyelet or is removed therefrom, respectively, thus causing the primary closure element 61 and the secondary closure elements 62 to be disconnected from and hence to be no longer secured to the retaining device 64.

The control of the retaining device 64 is effectuated via a controller 86 which may equally be arranged to control the inflator 54.

The multi-chamber airbag 10 forms a multi-chamber airbag device 100 together with the inflator 54 and the controller 86.

In order to adjust the multi-chamber airbag 10 in the case of restraint to the first state, the gas distribution mechanism 58 is adjusted to the first position (see FIGS. 1 and 2). This means that, starting from the initial position, the retaining device 64 is left in the retaining position. Further, gas will flow into the primary chamber 14 by means of the inflator 54.

Accordingly, the primary chamber 14 is inflated and expands.

The multi-chamber airbag 10 is designed so that, by the primary closure element 61 secured to the retaining device 64, the closure portions 82 remain spaced apart from the secondary outlets 52 so that gas flows via the secondary outlets 52 from the primary chamber 14 into the tertiary chamber 20, thus causing the latter to be inflated.

The primary outlet 51, on the other hand, is closed by the primary closure element 61 so that substantially no gas flows from the primary chamber 14 into the secondary chamber 18 and, consequently, the latter is not inflated.

In the first state of the multi-chamber airbag 10, the primary chamber 14 and the tertiary chamber 20 are thus inflated.

In order to adjust the multi-chamber airbag 10 in the case of restraint to the second state, the gas distribution mechanism 58 is adjusted to the second position (see FIGS. 3 and 4), that is, starting from the initial position, the retaining device 64 is adjusted to the released position. For example, for this purpose the retaining element is displaced or destroyed.

Further, gas is made to flow into the primary chamber 14 by means of the inflator 54. As a result, the primary chamber 14 is inflated and expands.

The primary closure element 61 released by the retaining device 64 is displaced by the pressure and, resp., the gas flow in the primary chamber 14 from the primary chamber 14 into the secondary chamber 18, where it is inverted.

The multi-chamber airbag 10 is designed so that the secondary closure elements 62 are entrained by the primary closure element 61 in the main deployment direction H so that the closure portions 82 overlap and close the associated secondary outlets 52.

The pressure prevailing in the primary chamber 14 ensures that the secondary closure elements 62 tightly abut on the airbag wall 16, thereby causing the secondary outlets 52 to be reliably closed.

Thus, in the second position, substantially no gas flows from the primary chamber 14 into the tertiary chamber 20 and, consequently, the latter is not inflated.

On the other hand, the gas flows from the primary chamber 14 through the primary outlet 51 into the primary closure element 61 and via the lateral discharge openings into the secondary chamber 18, thereby causing the latter to be inflated.

In the second state of the multi-chamber airbag 10, the primary chamber 14 and the secondary chamber 18 are thus inflated.

In this way, a multi-chamber airbag 10 is provided which can be inflated selectively to either of two states so as to provide, in a case of restraint, a protective effect that is better adapted to the position of the vehicle occupant 24 with whom the multi-chamber airbag 10 is associated.

The gas distribution mechanism 58 moreover has a particularly simple design and ensures the multi-chamber airbag 10 to be adjusted reliably to the first or second state in the case of restraint.

The invention is not limited to the shown embodiment. Specifically, individual features of one embodiment may be combined with any features of other embodiments, in particular independently of the other features of the respective embodiments.

Specifically, the multi-chamber airbag 10 in an alternative embodiment can include one or more additional chambers which are inflated when the multi-chamber airbag 10 is inflated to the first or second state.

These one or more further chambers may be fluid-connected to at least one of the chambers 14, 18, 20.

The invention claimed is:

1. A multi-chamber airbag, comprising
an airbag wall enclosing an inflatable primary chamber, and
a gas distribution mechanism,
wherein the airbag wall has a primary outlet and at least one secondary outlet,
wherein the gas distribution mechanism has a primary closure element and at least one secondary closure element,
wherein the gas distribution mechanism can be adjusted between a first position in which the multi-chamber airbag is inflated to a first state and a second position in which the multi-chamber airbag is inflated to a second state, and
wherein the multi-chamber airbag is configured so that, in the first position, the primary outlet is closed by the primary closure element so that no gas can flow out of the primary chamber via the primary outlet, and the at least one secondary outlet is released so that gas can flow out of the primary chamber via the at least one secondary outlet, and in the second position the primary outlet is released so that gas can flow out of the primary chamber via the primary outlet, and the at least one secondary outlet is closed by the at least one secondary closure element so that no gas can flow out of the primary chamber via the at least one secondary outlet.

2. The multi-chamber airbag according to claim 1, wherein the multi-chamber airbag includes a secondary chamber and a tertiary chamber, wherein the primary chamber in the first position of the gas distribution mechanism is fluid-connected via the secondary outlet to the tertiary chamber, and the primary chamber in the second position of the gas distribution mechanism is fluid-connected via the primary outlet to the secondary chamber.

3. The multi-chamber airbag according to claim 2, wherein the multi-chamber airbag includes a baffle which in the installed and deployed state of the multi-chamber airbag faces an associated vehicle occupant, and a circumferential wall which is connected to the baffle and extends, in the installed and deployed state of the multi-chamber airbag, between the baffle and a vehicle component to which the multi-chamber airbag is attached, wherein the circumferential wall at least partially has a multi-layer design and in the first state forms at least one annular tube which defines the tertiary chamber, and wherein a radially inner layer of the circumferential wall together with the baffle delimits the secondary chamber.

4. The multi-chamber airbag according to claim 3, wherein the at least one annular tube in the first state has a circular tube cross-section and in the second state is axially tensile-loaded so that the radially inner layer and a radially outer layer of the circumferential wall are mutually abutting and extend in the axial direction.

5. The multi-chamber airbag according to claim 3, wherein an axial distance ($A_1$, $A_2$) between the baffle and the vehicle component is larger in the second state than in the first state.

6. The multi-chamber airbag according to claim 3, wherein the primary chamber includes a gas source-side inlet opening and in the main deployment direction (H) abuts on the secondary chamber as well as is circumferentially delimited by the tertiary chamber.

7. The multi-chamber airbag according to claim 2, wherein the tertiary chamber has at least one portion which encloses the secondary chamber in ring shape.

8. The multi-chamber airbag according to claim 2, wherein the at least one secondary closure element in the second position extends out of the primary chamber through the primary outlet into the secondary chamber.

9. The multi-chamber airbag according to claim 1, wherein the airbag wall includes a one-piece airbag portion in which the primary outlet and the at least one secondary outlet are disposed.

10. The multi-chamber airbag according to claim 1, wherein the multi-chamber airbag includes plural secondary outlets and a corresponding number of secondary closure elements each being associated with one of the secondary outlets.

11. The multi-chamber airbag according to claim 10, wherein the secondary outlets are disposed in ring shape around centrically disposed primary outlet.

12. The multi-chamber airbag according to claim 1, wherein the at least one secondary closure element is secured to the primary closure element.

13. The multi-chamber airbag according to claim 12, wherein the at least one secondary closure element includes an elongate retaining end at which the at least one secondary closure element is secured to the primary closure element, an oppositely disposed securing end at which the at least one secondary closure element is secured to the airbag wall, and a closure portion for closing the associated secondary outlet, the multi-chamber airbag being designed such that in the first position the closure portion is disposed spaced apart from the associated secondary outlet and that the closure portion overlaps and thus closes the associated secondary outlet when the multi-chamber airbag is inflated to the second state.

14. The multi-chamber airbag according to claim 1, wherein the primary closure element is formed of two superimposed cut portions each being fan-shaped or bell-shaped as well as having an elongate end and an oppositely disposed circumferential edge at which the cut portion is secured to the airbag wall, wherein the cut portions are sewn up to each other at the elongate end as well as to a respective boundary area in the area of the circumferential edge, wherein the cut portions are not connected over a major part of lateral edges located between the elongate end and the circumferential edge so that two lateral discharge openings are formed in the primary closure element.

15. The multi-chamber airbag according to claim 1, wherein the primary closure element in the second position is completely disposed in the secondary chamber.

16. The multi-chamber airbag according to claim 15, wherein the primary closure element in the first position extends out of the secondary chamber through the primary outlet into the primary chamber.

17. The multi-chamber airbag according to claim 1, wherein the at least one secondary closure element in the first position is completely disposed in the primary chamber.

18. The multi-chamber airbag according to claim 1, wherein the gas distribution mechanism includes a retaining device which is adjustable between a retaining position and a released position, wherein the multi-chamber airbag is designed so that, in the released position, the primary closure element and the at least one secondary closure element are disconnected from the retaining device, and in the retaining position the primary closure element and the at least one secondary closure element are secured to the retaining device.

* * * * *